United States Patent
Olson

(10) Patent No.: US 8,674,950 B2
(45) Date of Patent: Mar. 18, 2014

(54) DUAL-SENSING-MODE TOUCH-SENSOR DEVICE

(75) Inventor: Dana Jon Olson, Kirkland, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 940 days.

(21) Appl. No.: 12/201,910

(22) Filed: Aug. 29, 2008

(65) Prior Publication Data

US 2009/0066669 A1    Mar. 12, 2009

Related U.S. Application Data

(60) Provisional application No. 60/970,431, filed on Sep. 6, 2007.

(51) Int. Cl.
*G06F 3/041* (2006.01)

(52) U.S. Cl.
USPC .................. 345/173; 178/18.01; 178/19.01

(58) Field of Classification Search
USPC ............... 178/18.01–19.07; 345/173–178
See application file for complete search history.

(56) References Cited

U.S. PATENT DOCUMENTS

| | | | |
|---|---|---|---|
| 5,159,159 A | | 10/1992 | Asher |
| 5,650,597 A | * | 7/1997 | Redmayne ............... 178/18.06 |
| 6,297,811 B1 | * | 10/2001 | Kent et al. .................... 345/173 |
| 6,323,846 B1 | | 11/2001 | Westerman et al. |
| 6,819,316 B2 | | 11/2004 | Schulz et al. |
| 7,262,609 B2 | | 8/2007 | Reynolds |
| 7,362,313 B2 | * | 4/2008 | Geaghan et al. ............. 345/173 |
| 2003/0028346 A1 | * | 2/2003 | Sinclair et al. ............... 702/150 |
| 2004/0140993 A1 | * | 7/2004 | Geaghan et al. ............. 345/702 |
| 2005/0083307 A1 | * | 4/2005 | Aufderheide et al. ....... 345/173 |
| 2007/0063983 A1 | * | 3/2007 | Huang et al. ................. 345/173 |
| 2007/0222764 A1 | * | 9/2007 | Wang ............................ 345/173 |
| 2007/0222767 A1 | * | 9/2007 | Wang ............................ 345/173 |

OTHER PUBLICATIONS

International Search Report and Written Opinion of the International Searching Authority, PCT/US08/10417 filed Sep. 5, 2008, mailed Nov. 25, 2008.

* cited by examiner

*Primary Examiner* — Michael Pervan

(57) ABSTRACT

A touch-sensor device is described. The touch sensor-device includes a panel having an array of capacitive sensors arranged to function, in a first direction, as a projected capacitance slider. The array of capacitive sensors is further arranged to function, in a second direction, as a set of independent surface capacitance sensors. A controller is coupled with the panel by an electrical component.

19 Claims, 8 Drawing Sheets

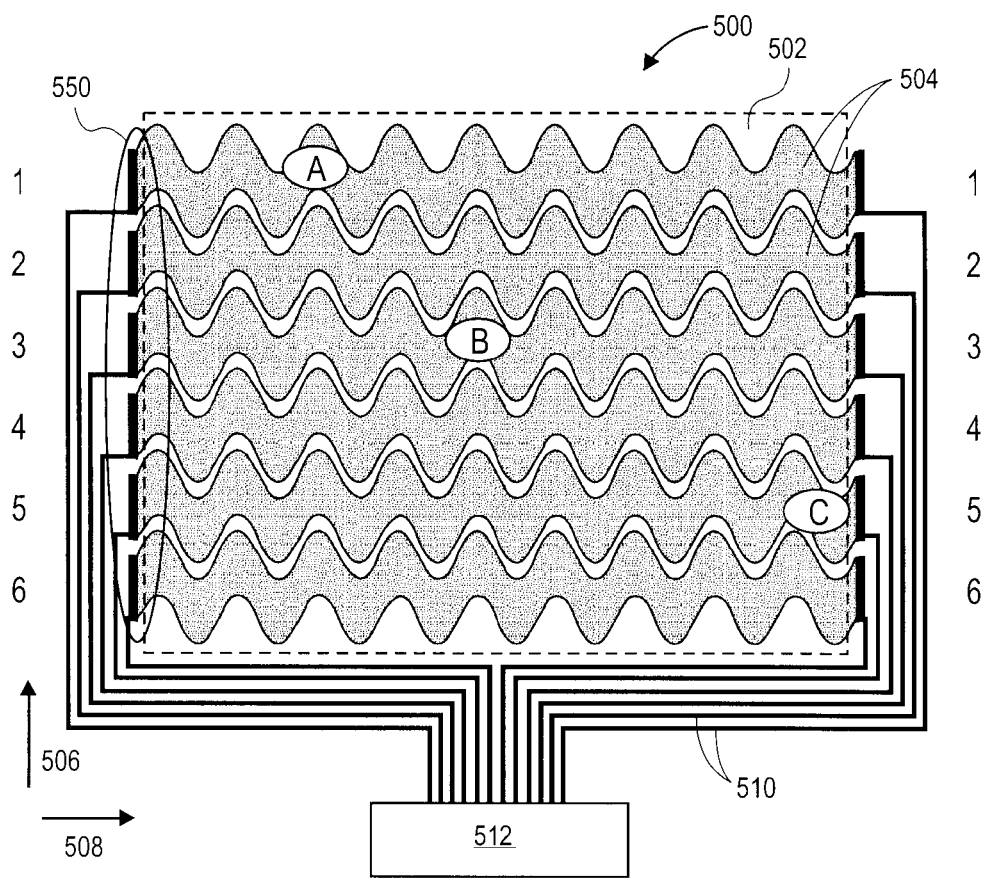
FIG. 5A
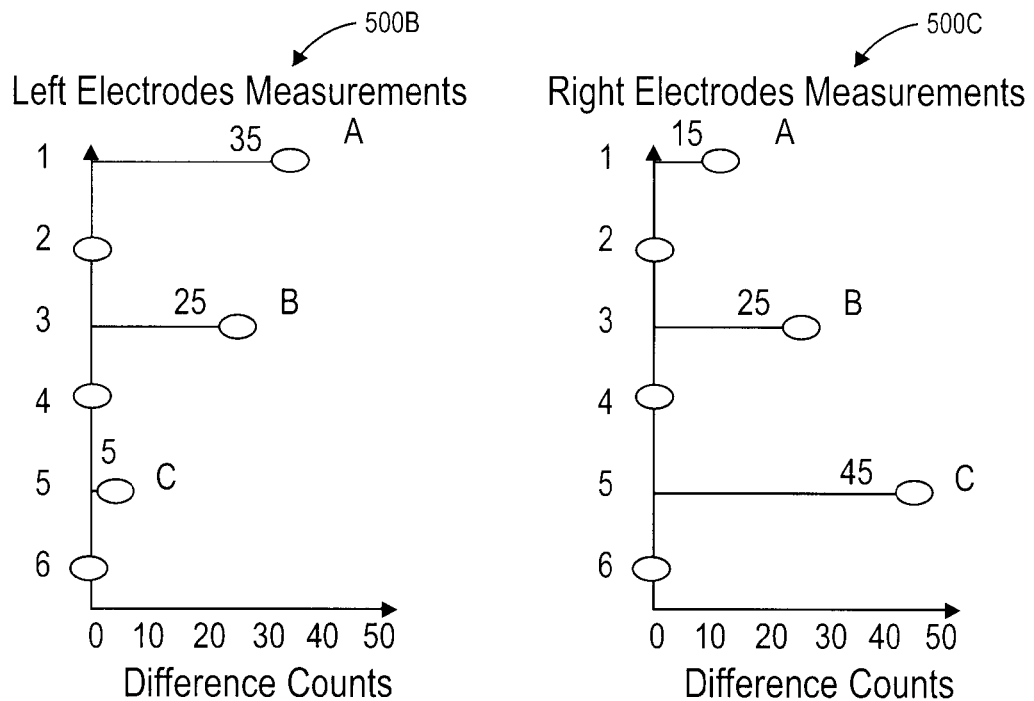
FIG. 5B     FIG. 5C

DUAL-SENSING-MODE TOUCH-SENSOR DEVICE

CROSS REFERENCE TO RELATED APPLICATIONS

This application claims the benefit of U.S. Provisional Application No. 60/970,431, filed Sep. 6, 2007, the entire contents of which are hereby incorporated by reference herein.

TECHNICAL FIELD

The disclosure is in the field of capacitive sensing devices and, in particular, dual-sensing-mode touch screens or touch pads.

BACKGROUND

Computing devices, such as notebook computers, personal data assistants (PDAs), mobile communication devices, and portable entertainment devices (such as handheld video game devices, multimedia players, and the like) have user interface devices, which are also known as human interface devices (HID), that facilitate interaction between the user and the computing device. One type of user-interface device that has become more common is a touch-sensor pad (also known as a "touchpad"). A touchpad replicates mouse X/Y movement by using two defined axes, which contain a collection of sensor elements that detect the position of a conductive object such as a finger. Mouse right/left button clicks can be replicated by two mechanical buttons, located in the vicinity of the touchpad, or by tapping commands on the touchpad itself. The touchpad provides a user-interface device for performing such functions as positioning a cursor and selecting an item on a display. These touch pads may include multi-dimensional sensor arrays for detecting movement in multiple axes. The sensor array may include a one-dimensional sensor array to detect movement in one axis. The sensor array may also be two-dimensional to detect movement in two axes.

One type of touchpad operates by way of capacitance sensing utilizing capacitive sensors. The capacitance detected by a capacitive sensor changes as a function of the proximity of a conductive object to the sensor. The conductive object can be, for example, a stylus or a user's finger. In a touch-sensor device, a change in capacitance detected by each sensor in the X and Y dimensions of the sensor array, due to the proximity or movement of a conductive object, can be measured by a variety of methods. Regardless of the method, usually an electrical signal representative of the capacitance detected by each capacitive sensor is processed by a processing device, which in turn develops electrical signals representative of the position of the conductive object in relation to the touch-sensor pad in the X and Y dimensions. A touch-sensor strip, slider, or button operates on the same capacitance-sensing principle.

BRIEF DESCRIPTION OF THE DRAWINGS

FIG. 5A illustrates a plan view of a portion of a dual-sensing-mode touch-sensor device having multiple touches received thereon, in accordance with an embodiment of the present invention.

FIG. 5B illustrates a plot of electrode measurements correlated with difference counts for a dual-sensing-mode touch-sensor device, in accordance with an embodiment of the present invention.

FIG. 5C illustrates a plot of electrode measurements correlated with difference counts for a dual-sensing-mode touch-sensor device, in accordance with an embodiment of the present invention.

DETAILED DESCRIPTION

Figure 1:
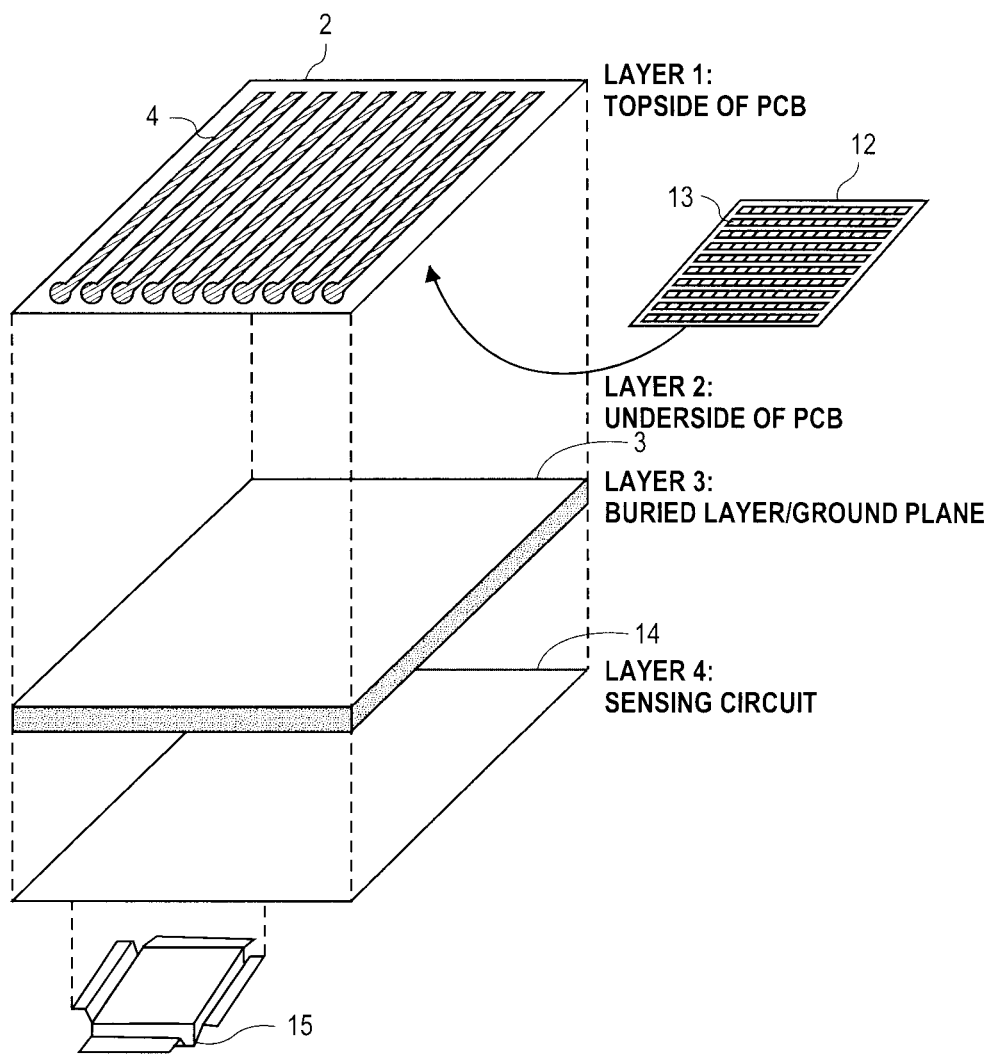
FIG. 1 illustrates an isometric view of a four-layer touchpad, in accordance with an embodiment of the present invention.

A single-layer dual-sensing-mode touch screen or touch pad is described herein. In the following description, numerous specific details are set forth, such as specific capacitor arrangements, in order to provide a thorough understanding of embodiments of the present invention. It will be apparent to one skilled in the art that embodiments of the present invention may be practiced without these specific details. In other instances, well-known fabrication operations, such as layer patterning operations, are not described in detail in order to not unnecessarily obscure embodiments of the present invention. Furthermore, it is to be understood that the various embodiments shown in the Figures are illustrative representations and are not necessarily drawn to scale.

Disclosed herein is a single-layer touch-sensor device. The touch sensor-device may include a panel having an array of capacitive sensors arranged to function, in a first direction, as a projected capacitance slider. In one embodiment, the array of capacitive sensors is further arranged to function, in a second direction, as a set of independent surface capacitance sensors. A method for determining a multi-touch result on a touch-sensor device may include scanning, in a first direction, an array of capacitive sensors as a pair of linear sliders. In one embodiment, the results of the scanning of each of the pair of linear sliders is then added into a single array to determine the first direction component of the multi-touch result. In a second direction, a second direction component of the multi-touch result may then be determined.

A single-layer dual-sensing-mode touch-sensor device, such as a touch screen or a touch pad, may be used to determine a multi-touch result on the touch-sensor device. In accordance with an embodiment of the present invention, a dual-sensing-mode touch-sensor device includes a panel having an array of capacitive sensors arranged to function, in a first direction, as a projected capacitance slider and, in a second direction, as a set of independent surface capacitance sensors. An otherwise single-layer uniform sheet surface capacitance panel, e.g. a panel that can only detect one touch at a time, may have a low signal due to attenuation by such a linearization pattern. On the other hand, two-layer projected capacitance touch pads and touch screens, e.g., those that include a matrix of pads along with sliders in both a vertical and a horizontal direction, may specify a large number of I/O channels to scan an array of capacitive sensors. Furthermore, two or more controllers are often specified to provide sufficient scanning channels and circuit connections. Instead, in an embodiment of the present invention, an array of capacitive sensors is arranged in a less expensive, single layer to function as a projected capacitance touch pad or touch screen in only one direction and as a plurality of uniform sheet surface capacitance panels in another direction. In one embodiment, such an arrangement reduces the number of controllers specified to provide sufficient scanning channels and circuit connections to a single controller without the detriment of providing a low signal due to attenuation by a linearization pattern. In one embodiment, an array of capacitive sensors, arranged to function in a first direction as a projected capacitance slider and in a second direction as a set of independent surface capacitance sensors, is fabricated for applications where multi-touch determination is desired in only one direction. In a specific embodiment, multiple touches are resolved along an axis parallel with the first direction, e.g., the direction along which the array of capacitive sensors is arranged to function as a projected capacitance slider.

Capacitive touch pads are constructed on four-layer and two-layer printed circuit boards (PCBs). For example, in a four-layer touchpad, the first and second layers contain the horizontal and vertical sensor elements (also referred to as pads) and interconnecting sensor traces that form the capacitive sensor matrix. The third layer contains a ground plane and the fourth layer contains the controller and associated circuitry and interconnections to the capacitive sensor matrix. In some two-layer touch pads, one layer contains the horizontal sensor elements and their corresponding interconnecting sensor traces. The second layer contains the vertical sensor elements and their interconnecting sensor traces. The controller resides on either of the two layers. It should be noted that in the field of capacitive touch pads, in reference to multiple-layer touch pads (e.g., "two-layer" or "four-layer" touch pads), the term "layer" is used to refer to a side of a non-conductive substrate upon which conductive material is disposed.

FIG. 1 illustrates an isometric view of a four-layer touchpad, in accordance with an embodiment of the present invention. The first layer 2 resides on the topside of the PCB having sensor traces 4 disposed in the vertical direction. These vertical sensor traces connect to vertically-aligned sensor elements disposed on the first layer (not shown). The second layer 12 resides on the underside of the PCB having sensor traces 13 disposed in the horizontal direction. These horizontal sensor traces connect to horizontally-aligned sensor elements disposed on the second layer (not shown). The third layer 3 is buried in the substrate of the PCB and houses the ground plane, which may connect to the topside or underside of the PCB using conductive traces and vias. Lastly, the fourth layer 14 includes the sensing circuit 15.

Figure 2:
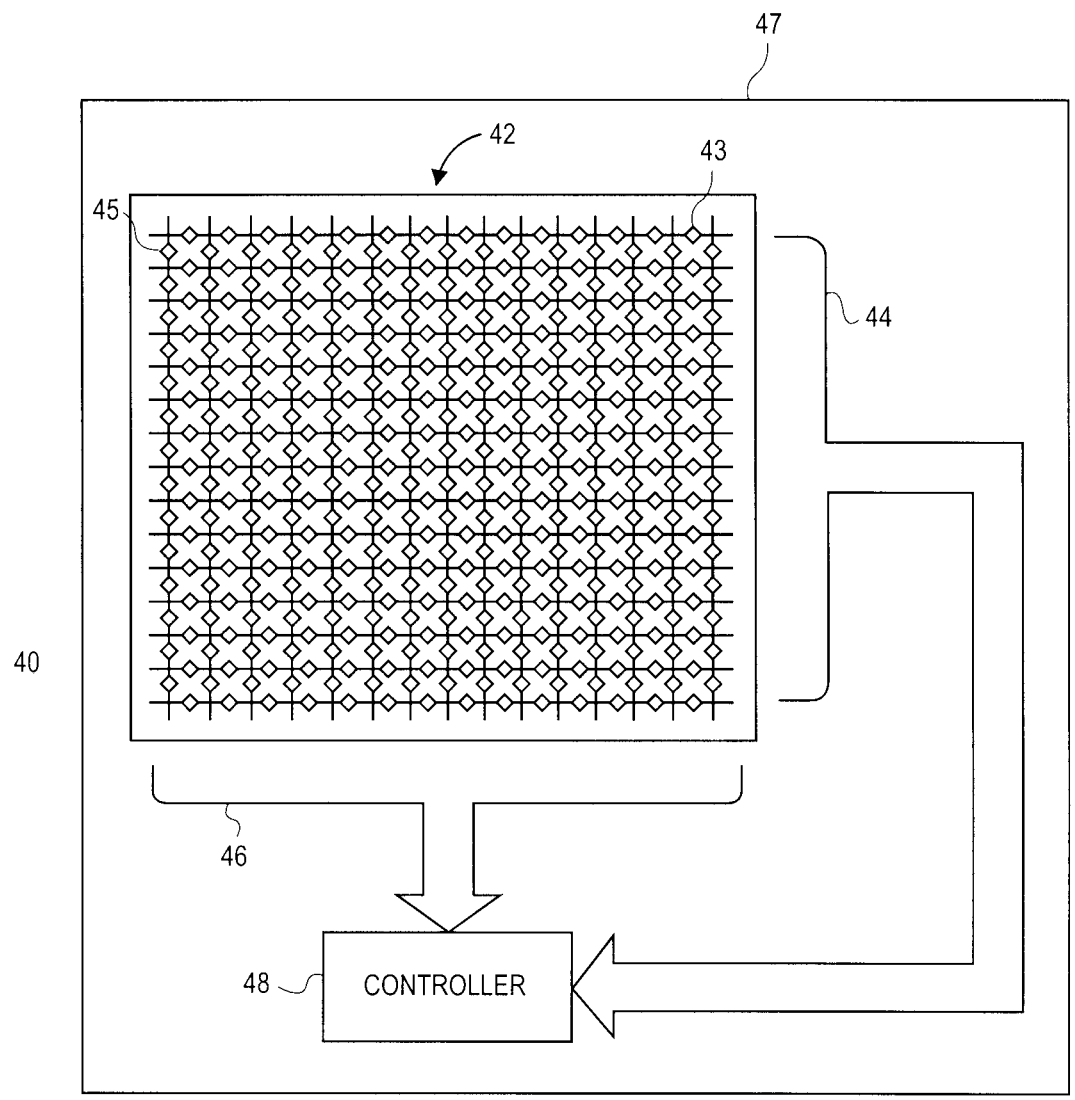
FIG. 2 illustrates a plan view of a two-layer touchpad, in accordance with an embodiment of the present invention.

FIG. 2 illustrates a plan view of a two-layer touchpad, in accordance with an embodiment of the present invention. The two-layer touchpad 40 illustrated in FIG. 2 includes the following: a capacitive sensor matrix 42, or array, having horizontal sensor elements 43 and vertical sensor elements 45 (represented by diamonds) and interconnecting horizontal sensor traces 44 and vertical sensor traces 46. A controller chip 48 is disposed on the same side of the PCB 47 as the sensor array 42. Although the horizontal sensor traces 44 and vertical sensor traces 46 appear to reside on the same layer in FIG. 2, such is only for conceptual purposes to understand the functional inter-relationship of the horizontal and vertical sensor elements of the array 42. As would be apparent to one of ordinary skill in the art, the horizontal sensor elements 43 and their interconnecting row sensor traces 44 reside on a different layer than the vertical sensor elements 45 and their interconnecting column sensor traces 46. The controller chip 48 disposed on one of these two different layers. Accordingly, the touchpad illustrated in FIG. 2 is a "two-layer" touchpad.

Referring again to FIG. 2, the controller chip 48 and the sensor elements 43 and 45 are disposed on two non-overlapping regions of the same circuit board 42. As such, circuit board 47 may be substantially larger than the touch-sensor array 42 in order to provide area for mounting the controller chip 48, associated circuitry, and interconnections between the controller chip 48 and the sensor elements 43 and 45.

Figure 3A:
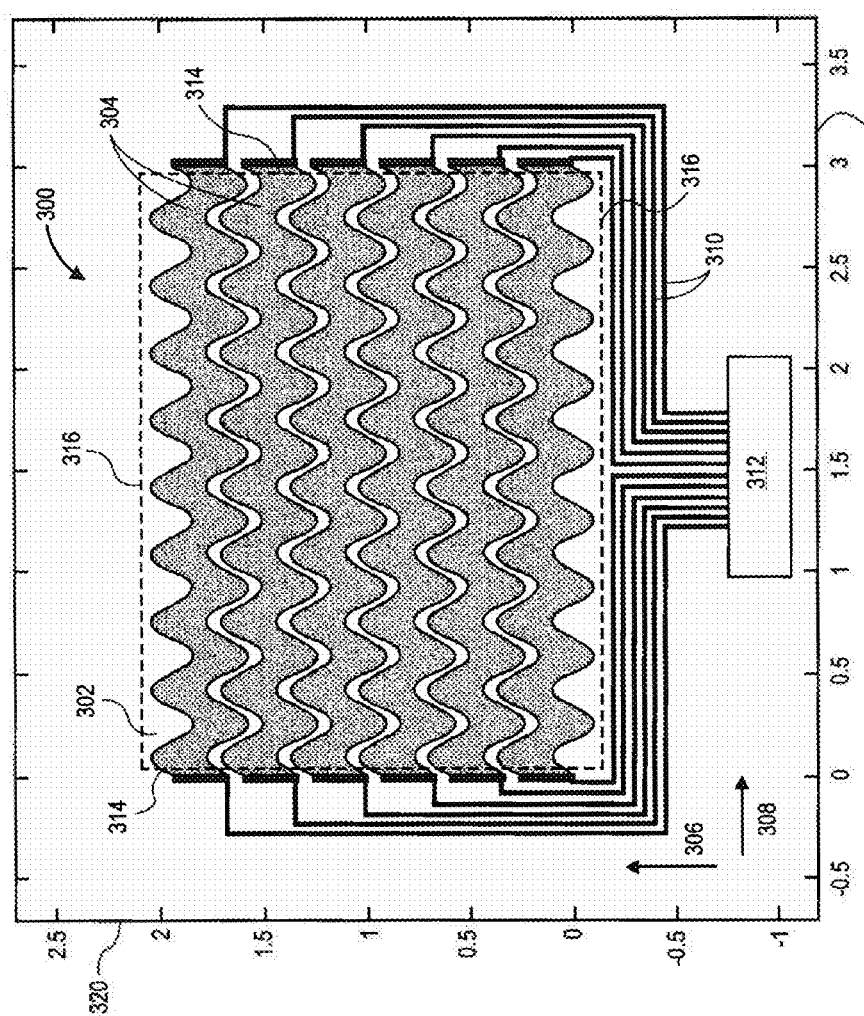
FIG. 3A illustrates a plan view of a portion of a single-layer dual-sensing-mode touch-sensor device, in accordance with an embodiment of the present invention.

In an aspect of the present disclosure, a dual-sensing-mode touch-sensor device includes a panel having an array of capacitive sensors arranged to function as a projected capacitance slider and as a set of independent surface capacitance sensors, depending on the orientation of the array. FIG. 3A illustrates a plan view of a portion of a single-layer dual-sensing-mode touch-sensor device, in accordance with an embodiment of the present invention.

Referring to FIG. 3A, a portion 300 of a touch-sensor device includes a panel 302 having an array of capacitive sensors 304 arranged to function, in a first direction 306, as a projected capacitance slider and, in a second direction 308, as a set of independent surface capacitance sensors. A controller 312 is coupled with panel 302 by an electrical component 310. In accordance with an embodiment of the present invention, the array of capacitive sensors 304 is composed of a pattern of interlaced strips of a resistive material. In one embodiment, the pattern of interlaced strips of the resistive material is composed of an arrangement of continuous wavy strips in a horizontal (second) direction 308 between a pair of vertical edges 314 of panel 302, as depicted in FIG. 3A. In a specific embodiment, each continuous strip is spaced equidistant in a vertical (first) direction 306 between a pair of horizontal edges 316 of panel 302, as is also depicted in FIG. 3A. That is, the gap that runs between the continuous strips is uniform along the length of the strips. In an alternative embodiment (not shown), the pattern of interlaced strips of the resistive material is composed of an arrangement of continuous wavy strips in a vertical (first) direction 306 between a pair of horizontal edges 316 of panel 302, each continuous strip spaced equidistant in a horizontal (second) direction 308 between a pair of vertical edges 314 of panel 302.

Electrical component 310 may be arranged in a fashion that maximizes the effectiveness of controller 312 when determining a multi-touch activity performed on panel 302, while still considering space and power constraints. In an embodiment, electrical component 310 is coupled to each continuous wavy strip of the array of capacitive sensors 304 along the pair of vertical edges 314 of panel 302, as depicted in FIG. 3A. In an alternative embodiment (not shown), the pattern of interlaced strips of the resistive material is composed of an arrangement of continuous wavy strips in a vertical direction between a pair of horizontal edges of the panel, and electrical component 310 is coupled to each continuous wavy strip of the array of capacitive sensors 304 along the pair of horizontal edges 316 of panel 302.

Figure 3C:
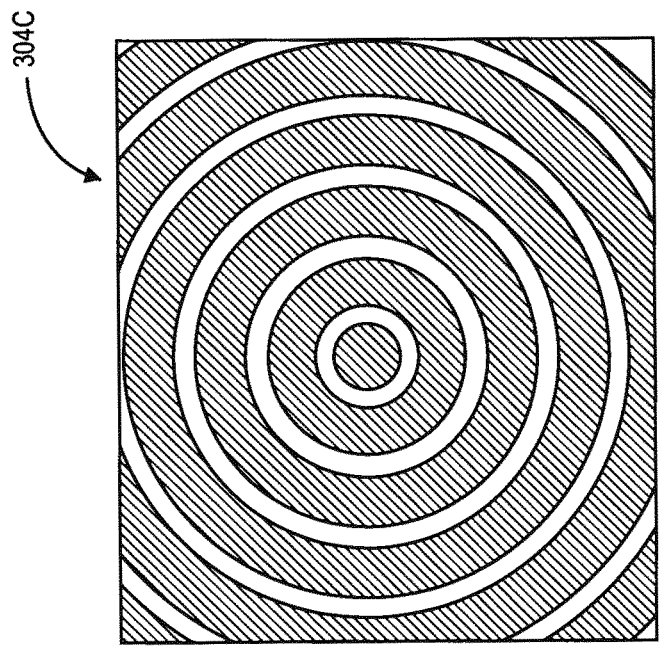
FIG. 3C illustrates a portion of a single-layer dual-sensing-mode touch-sensor device, wherein an array of capacitive sensors is composed of a pattern of relatively small concentric circular strips of a resistive material, in accordance with an embodiment of the present invention.
Figure 3B:
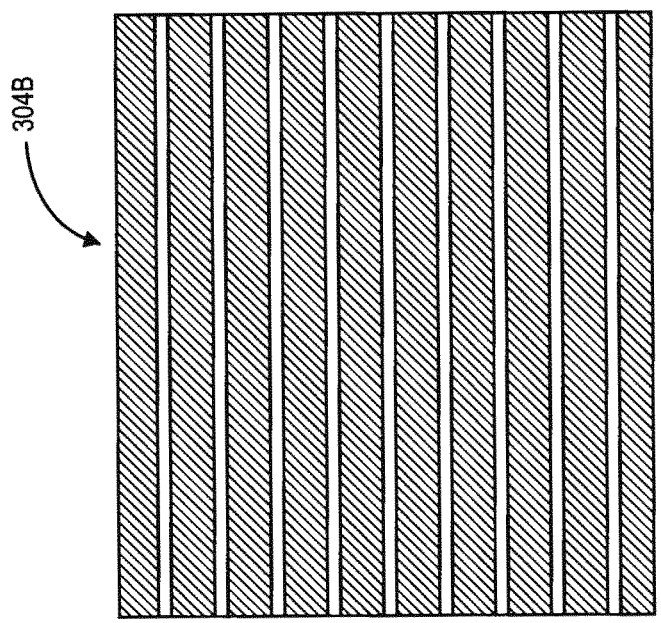
FIG. 3B illustrates a portion of a single-layer dual-sensing-mode touch-sensor device, wherein an array of capacitive sensors is composed of a pattern of relatively small rectangular strips of a resistive material, in accordance with an embodiment of the present invention.

The resistive material used to fabricate the array of capacitive sensors 304 may be a material with properties suitable to perform both as a uniform sheet surface capacitance panel and as a projected capacitance touch pad or touch screen. In accordance with an embodiment of the present invention, the resistive material is a material such as, but not limited to, indium tin oxide (ITO), a conductive ink, or a graphite trace. The arrangement of the resistive material may be any suitable arrangement that maximizes the overlap of a finger or touch device with multiple lines of the resistive material. For example, as described above in association with FIG. 3A, the arrangement may be an arrangement of interlaced continuous wavy lines. However, in accordance with another embodiment of the present invention, the lines of resistive material are formed small enough that a finger or a touch device will necessarily overlap with at least two lines. For example, in one embodiment, referring to FIG. 3B, the array of capacitive sensors 304B is composed of a pattern of relatively small rectangular strips of a resistive material. In another embodiment, referring to FIG. 3C, the array of capacitive sensors 304C is composed of a pattern of relatively small concentric circular strips of a resistive material. In an alternative embodiment, the array of capacitive sensors 304 is composed of an array of conductive, e.g. copper, interlaced buttons utilizing independent resistors to link buttons in rows of the array of capacitive sensors 304.

The array of capacitive sensors 304 may be arranged to have varying relative capacitance values, depending on the positioning of the touch by a finger or a touch device. For example, axes 320 and 322 represent an example of relative capacitance values for panel 302 along the vertical 306 and the horizontal 308 directions, respectively. In an embodiment, the array of capacitive sensors 304 is disposed in a single plane, as depicted in FIG. 3A.

Figure 4:
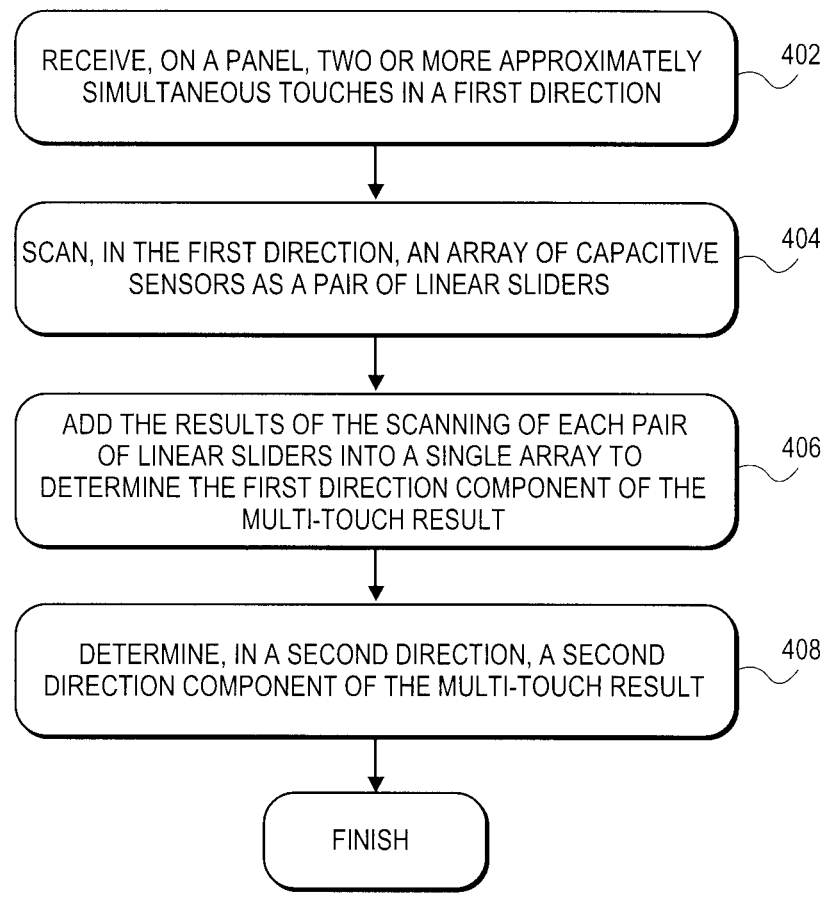
FIG. 4 is a Flowchart representing a series of operations for determining a multi-touch result on a dual-sensing-mode touch-sensor device, in accordance with an embodiment of the present invention.
Figure 5E:
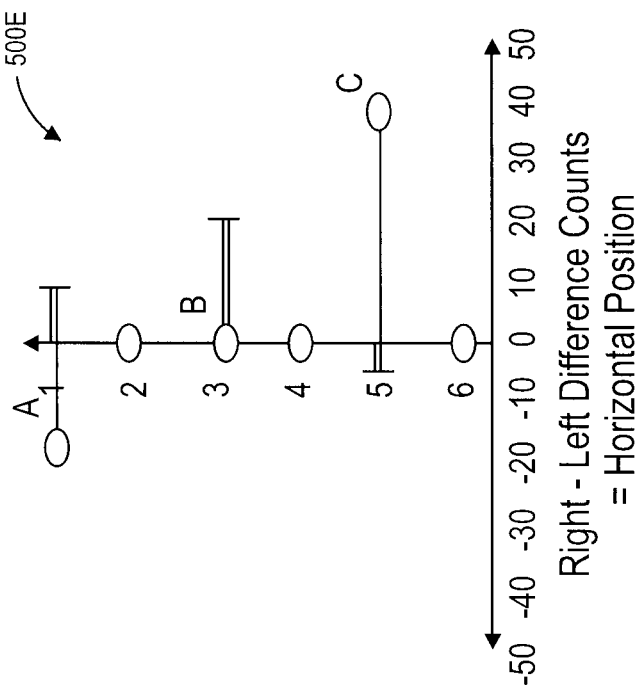
FIG. 5E illustrates a plot of electrode measurements correlated with difference counts for a dual-sensing-mode touch-sensor device, in accordance with an embodiment of the present invention.

In another aspect of the present disclosure, a dual-sensing-mode touch-sensor device, such as a touch screen or a touch pad, is used to determine a multi-touch result on the touch-sensor device. FIG. 4 is a Flowchart 400 representing a series of operations for determining a multi-touch result on a dual-sensing-mode touch-sensor device, in accordance with an embodiment of the present invention. FIG. 5A illustrates a plan view of a portion of a dual-sensing-mode touch-sensor device having multiple touches received thereon, in accordance with an embodiment of the present invention. FIGS. 5B-5E illustrate plots of electrode measurements correlated with difference counts for a dual-sensing-mode touch-sensor device, in accordance with an embodiment of the present invention.

Referring to operation 402 of Flowchart 400, a method for determining a multi-touch result on a touch-sensor device includes receiving, on a panel, two or more approximately simultaneous touches in a first direction. Referring to FIG. 5A, in an embodiment, a portion 500 of a touch-sensor device includes a panel 502 having an array of capacitive sensors 504 arranged to function, in a vertical direction 506, as a projected capacitance slider and, in a horizontal direction 508, as a set of independent surface capacitance sensors. A controller 512 is coupled with panel 502 by an electrical component 510. In accordance with an embodiment of the present invention, operation 402 includes receiving, on panel 502, three approximately simultaneous touches (A, B, and C) along vertical direction 506, as depicted in FIG. 5A. In one embodiment, the approximately simultaneous touches may be made by a finger or several fingers, or may be made by a touch simulator device, such as a pointer or a stylus.

Referring to operation 404 of Flowchart 400, the method further includes scanning, in a first direction, an array of capacitive sensors as a pair of sliders. In accordance with an embodiment of the present invention, operation 404 includes scanning, in vertical direction 506 of FIG. 5A, the array of capacitive sensors 504 as a pair of linear sliders 550. Referring to FIGS. 5B and 5C, plots 500B and 500C represent left electrode measurements and right electrode measurements, respectively, as a function of difference counts. In an embodiment, the difference counts are determined by scanning the array of capacitive sensors 504 as linear sliders 550, as depicted in FIGS. 5A-5C.

Scanning the array of capacitive sensors 504, as per operation 404, may be performed for any arrangement of the array of capacitive sensors 504 suitable for detecting multiple approximately simultaneous touches. For example, in accordance with an embodiment of the present invention, scanning the array of capacitive sensors 504 includes scanning a pattern of interlaced strips of a resistive material. In one embodiment, scanning the pattern of interlaced strips of the resistive material includes scanning an arrangement of continuous wavy horizontal strips along a pair of vertical edges of the arrangement, as depicted in FIG. 5A. In one embodiment (not shown), scanning the pattern of interlaced strips of the resistive material comprises scanning an arrangement of continuous wavy vertical strips along a pair of horizontal edges of the arrangement. However, the arrangement need not be interlaced. For example, in accordance with another embodiment of the present invention (not shown), scanning the array of capacitive sensors 504 includes scanning a pattern of rectangular strips of a resistive material. In one embodiment, scanning the pattern of rectangular strips of the resistive material includes scanning an arrangement of continuous horizontal strips along a pair of vertical edges of the arrangement. In one embodiment, scanning the pattern of rectangular strips of the resistive material comprises scanning an arrangement of continuous vertical strips along a pair of horizontal edges of the arrangement. In yet another embodiment of the present invention, scanning the array of capacitive sensors 504 includes scanning a pattern of concentric circular strips of a resistive material.

Figure 5D:
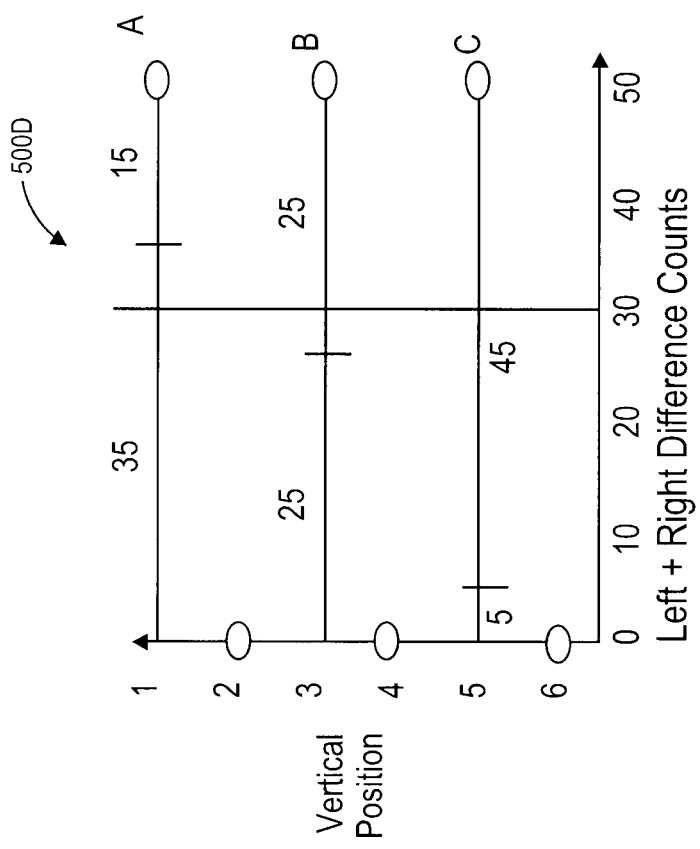
FIG. 5D illustrates a plot of electrode measurements correlated with difference counts for a dual-sensing-mode touch-sensor device, in accordance with an embodiment of the present invention.

Referring to operation 406 of Flowchart 400, the results of the scanning of each of the pair of linear sliders is added into a single array to determine the first direction component of the multi-touch result. Referring to FIG. 5D, plot 500D represents the addition of left and right electrode measurements as a function of difference counts. In one embodiment, the first direction referred to in operation 406 is vertical direction 506. Thus, in one embodiment, vertical positions for multiple touches A, B and C are determined based on the additive scanning of the linear sliders 550. In a specific embodiment, adding the results of each of the pair of linear sliders 550 into the single array to determine the first (in this case, vertical) direction component of the multi-touch result includes calculating a centroid in vertical direction 506.

Referring to operation 408 of Flowchart 400, in a second direction, a second direction component of the multi-touch result is determined. In accordance with an embodiment of the present invention, determining the second direction component of the multi-touch result comprises subtracting the results of each of the pair of linear sliders. For example, referring to FIG. 5E, plot 500E represents the subtraction of left from right electrode measurements as a function of difference counts. In one embodiment, the second direction referred to in operation 408 is horizontal direction 508. Thus, in one embodiment, horizontal positions for multiple touches A, B and C are determined based on the subtractive scanning of the linear sliders 550. In an alternative embodiment, determining, in operation 408, the second direction component of the multi-touch result includes sequentially grounding portions of the array of capacitive sensors along an axis parallel with the second direction. In that embodiment, guard traces overlapping the edges of the resistive material of panel 502 may be incorporated into the touch-sensor device.

Figure 6:
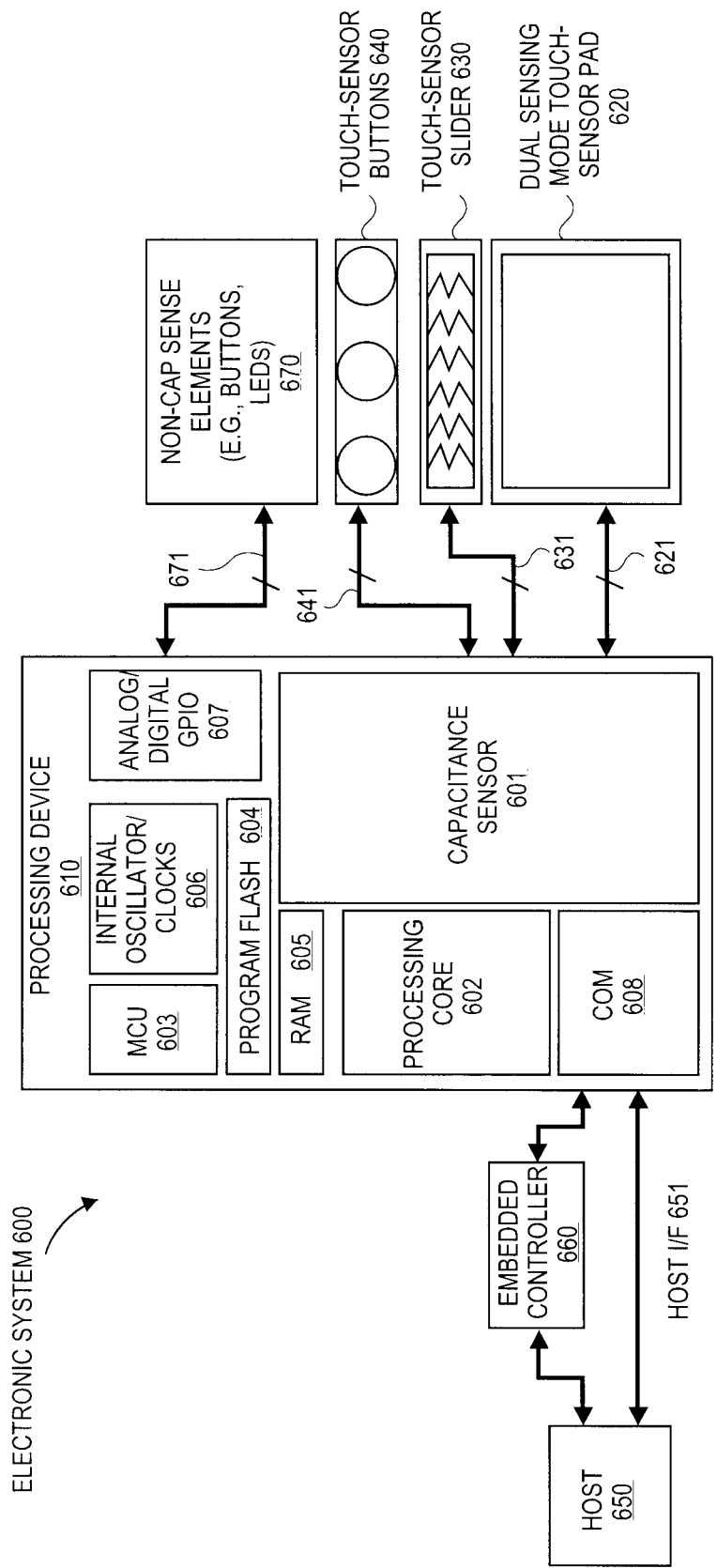
FIG. 6 illustrates a block diagram of an electronic system having a processing device for detecting a presence of a conductive object on a dual-sensing-mode touch-sensor, in accordance with an embodiment of the present invention.

In an aspect of the present disclosure, an electronic device may be fabricated to include a dual-sensing-mode touch-sensor device with a panel having an array of capacitive sensors arranged to function, in a first direction, as a projected capacitance slider and, in a second direction, as a set of independent surface capacitance sensors. FIG. 6 illustrates a block diagram of an electronic system having a processing device for detecting a presence of a conductive object on a dual-sensing-mode touch-sensor, in accordance with an embodiment of the present invention.

Referring to FIG. 6, electronic system 600 includes processing device 610, dual-sensing-mode touch-sensor pad 620, touch-sensor slider 630, touch-sensor buttons 640, host processor 650, embedded controller 660, and non-capacitance sensor elements 670. The processing device 610 may include analog and/or digital general purpose input/output ("GPIO") ports 607. GPIO ports 607 may be programmable. GPIO ports 607 may be coupled to a Programmable Interconnect and Logic ("PIL"), which acts as an interconnect between GPIO ports 607 and a digital block array of the processing device 610 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 610 may also include memory, such as random access memory (RAM) 605 and program flash 604. RAM 605 may be static RAM (SRAM) or the like, and program flash 604 may be a non-volatile storage, or the like, which may be used to store firmware (e.g., control algorithms executable by processing core 602 to implement operations described herein). Processing device 610 may also include a memory controller unit (MCU) 603 coupled to memory 604 or 605 and the processing core 602.

As illustrated, capacitance sensor 601 may be integrated into processing device 610. Capacitance sensor 601 may include analog I/O for coupling to an external component, such as dual-sensing-mode touch-sensor pad 620, touch-sensor slider 630, touch-sensor buttons 640, or other devices. Capacitance sensor 601 and processing device 610 are described in more detail below.

It should be noted that the embodiments described herein are not limited to touch-sensor pads for notebook implementations, but can be used in other capacitive sensing implementations, for example, the sensing device may be a touch screen, a touch-sensor slider 630, or a touch-sensor button 640 (e.g., capacitance sensing button). It should also be noted that the embodiments described herein may be implemented in sensing technologies other than capacitive sensing, such as resistive, optical imaging, surface acoustical wave (SAW), infrared, dispersive signal, and strain gauge technologies. Similarly, the operations described herein are not limited to notebook pointer operations, but can include other operations, such as lighting control (dimmer), temperature or environmental control, volume control, graphic equalizer control, speed control, or other control operations specifying gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition and numeric keypad operation.

In one embodiment, the electronic system 600 includes a dual-sensing-mode touch-sensor pad 620 coupled to the processing device 610 via bus 621. Dual-sensing-mode touch-sensor pad 620 may include a panel having an array of capacitive sensors arranged to function, in a first direction, as a projected capacitance slider and, in a second direction, as a set of independent surface capacitance sensors, as described in embodiments above. In another embodiment, dual-sensing-mode touch-sensor pad 620 may be a transparent touch screen. In another embodiment, the electronic system 600 includes a touch-sensor slider 630 coupled to the processing device 610 via bus 631. Touch-sensor slider 630 may be a linear slider. In one embodiment, the sensor elements of the sensor array are capacitance sensor elements. Capacitance sensor elements may be used as non-contact sensors. These sensor elements, when protected by an insulating layer, offer resistance to severe environments.

The electronic system 600 may include any combination of one or more of dual-sensing-mode touch-sensor pad 620, touch-sensor slider 630, or touch-sensor button 640. In another embodiment, the electronic system 600 also includes non-capacitance sensor elements 670 coupled to the processing device 610 via bus 671. The non-capacitance sensor elements 670 may include buttons, light emitting diodes (LEDs), and other user interface devices, such as a mouse, a keyboard, a display, or other functional keys that do not use capacitance sensing. In one embodiment, buses 671, 641, 631, and 621 are a single interconnect. Alternatively, these buses may be configured into any combination of one or more separate buses.

The processing device 610 may also provide value-added functionality such as keyboard control integration, LEDs, battery charger, and general purpose I/O, as illustrated as non-capacitance sensor elements 670. Non-capacitance sensor elements 670 are coupled to the GPIO 607.

Processing device 610 may include internal oscillator/clocks 606 and communication block 608. The oscillator/clocks block 606 provides clock signals to one or more of the components of processing device 610. Communication block 608 may be used to communicate with an external component, such as a host processor 650, via host interface (I/F) 651. Alternatively, processing block 610 may also be coupled to embedded controller 660 to communicate with the external components, such as host 650. Interfacing to the host 650 can be through various methods. In one exemplary embodiment, interfacing with the host 650 is done using a standard PS/2 interface to connect to an embedded controller 660, which in turn sends data to the host 650 via a low pin count (LPC) interface. In some instances, it may be beneficial for the processing device 610 to do both touch-sensor pad and keyboard control operations, thereby freeing up the embedded controller 660 for other housekeeping functions. In another exemplary embodiment, interfacing is done using a universal serial bus (USB) interface directly coupled to the host 650 via host interface 651. Alternatively, the processing device 610 may communicate to external components, such as the host 650, using industry standard interfaces, such as USB, PS/2, inter-integrated circuit (I2C) bus, or system packet interfaces (SPI). The host 650 and/or embedded controller 660 may be coupled to the processing device 610 with a ribbon or flex cable from an assembly, which houses the sensing device and processing device.

In one embodiment, the processing device 610 is configured to communicate with the embedded controller 660 or the host 650 to send and/or receive data. The data may be a command or alternatively a signal. In an exemplary embodiment, the electronic system 600 operates in both standard-mouse compatible and enhanced modes. The standard-mouse compatible mode utilizes the HID class drivers already built into the Operating System (OS) software of host 650. These drivers enable the processing device 610 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 610 may be configured to communicate with the embedded controller 660 or the host 650, using non-OS drivers, such as dedicated touch-sensor pad drivers, or other drivers known by those of ordinary skill in the art.

In one embodiment, the processing device 610 is configured to communicate data (e.g., commands or signals) using hardware, software, and/or firmware, and the data may be communicated directly to the processing device of the host 650, such as a host processor, or alternatively, may be communicated to the host 650 via drivers of the host 650, such as OS drivers, or other non-OS drivers. It should also be noted that the host 650 may directly communicate with the processing device 610 via host interface 651.

In one embodiment, the data sent to the host 650 from the processing device 610 includes click, double-click, movement of the pointer, scroll-up, scroll-down, scroll-left, scroll-right, step Back, and step Forward. In another embodiment, the data sent to the host 650 include the position or location of the one or more conductive objects on the sensing device. Alternatively, other user interface device commands may be communicated to the host 650 from the processing device 610. These commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

Processing device 610 may reside on a common carrier substrate such as, for example, an integrated circuit (IC) die substrate, a multi-chip module substrate, or the like. Alternatively, the components of processing device 610 may be one or more separate integrated circuits and/or discrete components. In one exemplary embodiment, processing device 610 is a Programmable System on a Chip (PSoC®) device, manufactured by Cypress Semiconductor Corporation, San Jose, Calif. Alternatively, processing device 610 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device is a network processor having multiple processors including a core unit and multiple micro-engines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 610 may also be done in the host. In another embodiment, the processing device 610 is the host.

Embodiments of the method and apparatus described herein may be implemented in a fully self-contained dual-sensing-mode touch-sensor pad which outputs fully processed X/Y movement and gesture data signals or data commands to a host. The method and apparatus may also be implemented in a dual-sensing-mode touch-sensor pad which outputs X/Y movement data and also finger presence data to a host, and where the host processes the received data to detect gestures. The method and apparatus may also be implemented in a dual-sensing-mode touch-sensor pad which outputs raw capacitance data to a host, where the host processes the capacitance data to compensate for quiescent and stray capacitance, and calculates X/Y movement and detects gestures by processing the capacitance data. Alternatively, the method and apparatus may be implemented in a dual-sensing-mode touch-sensor pad which outputs pre-processed capacitance data to a host, where the touchpad processes the capacitance data to compensate for quiescent and stray capacitance, and the host calculates X/Y movement and detects gestures from the pre-processed capacitance data.

The electronic system that includes the embodiments described herein may be implemented in a dual-sensing-mode touch-sensor pad of a laptop (e.g., notebook computer). Alternatively, it may be implemented in a wired or wireless keyboard integrating a dual-sensing-mode touch-sensor pad, which is itself connected to a host. Alternatively, it may be implemented as a transparent touch screen. Alternatively, the embodiments may be implemented in a mobile handset (e.g., cellular or mobile phone) or other electronic devices where the dual-sensing-mode touch-sensor pad may operate in one of two or more modes. For example, the dual-sensing-mode touch-sensor pad may operate either as a dual-sensing-mode touch-sensor pad for x/y positioning and gesture recognition, or as a keypad or other arrays of touch-sensor buttons and/or sliders. Alternatively, the dual-sensing-mode touch-sensor pad, although configured to operate in the two modes, may be configured to be used only as a keypad, or only as a single-sensing-mode touch-sensor pad. Alternatively, the electronic device may be used in other applications, such as a personal data assistant (PDA), a kiosk, a keyboard, a television, a remote control, a monitor, a handheld multi-media device, a handheld video player, a handheld gaming device, or a control panel.

Capacitance sensor 601 may be integrated into the processing device 610, or alternatively, in a separate IC. Alternatively, descriptions of capacitance sensor 601 may be generated and compiled for incorporation into other integrated circuits. For example, behavioral level code describing capacitance sensor 601, or portions thereof, may be generated using a hardware description language, such as VHDL or Verilog, and stored to a machine-accessible medium (e.g., Flash ROM, CD-ROM, hard disk, floppy disk, or the like). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 601.

It should be noted that the components of electronic system 600 may include all the components described above. Alternatively, electronic system 600 may include only some of the components described above, or include additional components not listed herein.

In one embodiment, capacitance sensor 601 is a capacitive sense relaxation oscillator (CSR). The CSR may include a current-programmable relaxation oscillator, an analog multiplexer, digital counting functions, and high-level software routines to compensate for environmental and physical sensor element variations.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, sigma-delta modulators, charge-accumulation circuits, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may specify very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 610. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Thus, a touch-sensor device has been disclosed. In accordance with an embodiment of the present invention, the touch sensor-device includes a panel having an array of capacitive sensors arranged to function, in a first direction, as a projected capacitance slider. The array of capacitive sensors is further arranged to function, in a second direction, as a set of independent surface capacitance sensors. A controller is coupled with the panel by an electrical component. In one embodiment, the array of capacitive sensors includes a pattern of interlaced strips of a resistive material. In a specific embodiment, the pattern of interlaced strips of the resistive material includes an arrangement of continuous wavy strips in a horizontal direction between a pair of vertical edges of the panel, each continuous strip spaced equidistant in a vertical direction between a pair of horizontal edges of the panel. In a particular embodiment, the electrical component of the touch-sensor device is coupled to each continuous wavy strip along the pair of vertical edges of the panel.

What is claimed is:

1. A touch-sensor device, comprising:
a panel having an array of capacitive sensors arranged to operate, in a first direction corresponding to a first axis of the panel, as a projected capacitance slider and, in a second direction corresponding to a second axis of the panel, as a set of independent surface capacitance sensors to detect a position of a touch in the second direction, wherein the first axis and the second axis are perpendicular; and
a controller coupled with the panel by an electrical component, wherein the controller is coupled to a first end and a second end of each of the capacitive sensors along the second axis of the panel, the controller to determine a multi-touch result on the panel using additive scanning of the capacitive sensors in the first direction and subtractive scanning of the capacitive sensors in the second direction.

2. The touch-sensor device of claim 1, wherein the array of capacitive sensors comprises a pattern of interlaced strips of a resistive material.

3. The touch-sensor device of claim 2, wherein the pattern of interlaced strips of the resistive material comprises an arrangement of continuous wavy strips in a horizontal direction between a pair of vertical edges of the panel, each continuous strip spaced equidistant in a vertical direction between a pair of horizontal edges of the panel.

4. The touch-sensor device of claim 3, wherein the electrical component is coupled to each continuous wavy strip along the pair of vertical edges of the panel.

5. The touch-sensor device of claim 2, wherein the pattern of interlaced strips of the resistive material comprises an arrangement of continuous wavy strips in a vertical direction between a pair of horizontal edges of the panel, each continuous strip spaced equidistant in a horizontal direction between a pair of vertical edges of the panel.

6. The touch-sensor device of claim 5, wherein the electrical component is coupled to each continuous wavy strip along the pair of horizontal edges of the panel.

7. The touch-sensor device of claim 2, wherein the resistive material is a material selected from the group consisting of indium tin oxide (ITO), a conductive ink, and a graphite trace.

8. The touch-sensor device of claim 1, wherein the array of capacitive sensors comprises a pattern selected from the group consisting of a pattern of rectangular strips of a resistive material and a pattern of concentric circular strips of a resistive material.

9. The touch-sensor device of claim 1, wherein the array of capacitive sensors is disposed in a single plane.

10. A method of determining a multi-touch result on a touch-sensor device, comprising:
receiving, on a panel, two or more approximately simultaneous touches in a first direction corresponding to a first axis of the panel;
scanning, in the first direction, an array of capacitive sensors in the panel as a pair of linear sliders;
adding results of the scanning of each of the pair of linear sliders into a single array to determine a first direction component of the multi-touch result; and
determining, by a controller coupled to a first and a second ends of each of the capacitive sensors in a second direction corresponding to a second axis of the panel, a second direction component of the multi-touch result by subtracting the results of scanning each of the pair of linear sliders, wherein the second direction component comprises a position of the touches in the second direction, wherein the first axis and the second axis are perpendicular.

11. The method of claim 10, wherein adding the results of each of the pair of linear sliders into the single array to determine the first direction component of the multi-touch result comprises calculating a centroid.

12. The method of claim 10, wherein determining the second direction component of the multi-touch result comprises sequentially grounding portions of the array of capacitive sensors along an axis parallel with the second direction.

13. The method of claim 10, wherein scanning the array of capacitive sensors comprises scanning a pattern of interlaced strips of a resistive material.

14. The method of claim 13, wherein scanning the pattern of interlaced strips of the resistive material comprises scanning an arrangement of continuous wavy horizontal strips along a pair of vertical edges of the arrangement.

15. The method of claim 13, wherein scanning the pattern of interlaced strips of the resistive material comprises scanning an arrangement of continuous wavy vertical strips along a pair of horizontal edges of the arrangement.

16. The method of claim 10, wherein scanning the array of capacitive sensors comprises scanning a pattern of rectangular strips of a resistive material.

17. The method of claim 16, wherein scanning the pattern of rectangular strips of the resistive material comprises scanning an arrangement of continuous horizontal strips along a pair of vertical edges of the arrangement.

18. The method of claim 16, wherein scanning the pattern of rectangular strips of the resistive material comprises scanning an arrangement of continuous vertical strips along a pair of horizontal edges of the arrangement.

19. The method of claim 10, wherein scanning the array of capacitive sensors comprises scanning a pattern of concentric circular strips of a resistive material.

* * * * *